(12) United States Patent
McBride et al.

(10) Patent No.: US 10,797,906 B2
(45) Date of Patent: Oct. 6, 2020

(54) OVER-THE-TOP INTERNET SERVICE PROVISIONING

(71) Applicant: CenturyLink Intellectual Property LLC, Broomfield, CO (US)

(72) Inventors: Kevin M. McBride, Lone Tree, CO (US); Thomas Charles Barnett, Jr., Monroe, LA (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 109 days.

(21) Appl. No.: 16/215,404

(22) Filed: Dec. 10, 2018

(65) Prior Publication Data

US 2020/0136855 A1    Apr. 30, 2020

Related U.S. Application Data

(60) Provisional application No. 62/752,230, filed on Oct. 29, 2018.

(51) Int. Cl.
*G06F 15/16* (2006.01)
*H04L 12/28* (2006.01)
*H04L 12/24* (2006.01)
*H04L 12/66* (2006.01)

(52) U.S. Cl.
CPC ...... *H04L 12/2876* (2013.01); *H04L 12/2898* (2013.01); *H04L 12/66* (2013.01); *H04L 41/18* (2013.01)

(58) Field of Classification Search
USPC .................. 709/218, 220, 222, 227, 228
See application file for complete search history.

*Primary Examiner* — Lan Dai T Truong (57) ABSTRACT

Novel tools and techniques for provisioning OTT internet services are provided. A system includes a user device associated with a first customer, a first physical customer local area network, and an enhanced network gateway. The enhanced network gateway may be configured to instantiate a virtual gateway associated with the first physical customer local area network, create a secure domain associated with the first physical customer local area network, determine whether a subscriber account is associated with the first customer. Responsive to determining that a subscriber account is not associated with the first customer, the enhanced network gateway may further provide a consumer portal to the user device, receive a selection of one or more services through the consumer portal, establish a connection to a service provider network associated with the one or more services, and provision the one or more services over the first physical customer local area network.

20 Claims, 7 Drawing Sheets

OVER-THE-TOP INTERNET SERVICE PROVISIONING

CROSS REFERENCE TO RELATED APPLICATIONS

This application claims priority to U.S. Provisional Patent Application Ser. No. 62/752,230, filed Oct. 29, 2018 by Kevin M. McBride et al. , entitled "Over-the-Top Internet Service Provisioning," the entire disclosure of which is incorporated herein by reference in its entirety for all purposes.

This application may also be related to U.S. patent application Ser. No 16/215,410, filed Dec. 10, 2018 by Kevin M. McBride et al. , entitled "Over-the-Top Access to Distributed Local Resources," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network access and service provisioning, and more particularly to an architecture and scheme for delivering over-the-top Internet service provisioning to subscribers.

BACKGROUND

Traditionally, incumbent local exchange carriers (ILEC) have been required to offer unbundled network elements as part of local loop unbundling, in which competitive local exchange carriers (CLEC) are able to deliver services to a customer without having to lay their own network infrastructure. Typically, CLECs would be allowed to lease and install various network appliances (e.g., unbundled network elements) such as routers, switches, digital subscriber line access multiplexers (DSLAM) on existing ILEC infrastructure. To provision internet service, a CLEC would typically provide or lease a network interface device (NID) and other customer premises equipment (CPE), such as a residential gateway (RG) or business gateway (BG), to provision internet service to a customer.

Increasingly, to meet the growing demands for over-the-top (OTT) services and applications, as well as cloud-based services and resources, server infrastructure and data center functionality has been pushed closer to the customers and distributed across a service provider's network, such as at a central office (CO) or headend. OTT services typically leverage an existing architecture, such as an IP network, to offer services that bypass traditional distribution channels (e.g., video and voice services). Unlike OTT services, however, a customer's internet service is typically limited to a specific customer premises, and/or customer premises equipment.

Accordingly, tools and techniques for implementing OTT internet service provisioning are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for OTT internet service provisioning is provided. The system may include a user device, a first physical customer local area network, and an enhanced network gateway. The user device and the first physical customer local area network may be associated with a first customer. The first physical customer local area network may further include at least part of a physical circuit from the user device to a network edge. The network edge may further include an enhanced network gateway located within a central office. The enhanced network gateway may include a processor, and non-transitory computer readable media comprising instructions executable by the processor to instantiate a virtual gateway associated with the first physical customer local area network, and create, via the virtual gateway, a secure domain associated with the first physical customer local area network. The instructions may further be executable by the processor to determine whether a subscriber account is associated with the first customer, and responsive to determining that a subscriber account is not associated with the first customer, provide, via the first physical customer local area network, a consumer portal to the user device. The instructions may further be configured to be executable to receive, from the user device, a selection of one or more services through the consumer portal, establish a connection to a service provider network associated with the one or more services, and provision, via the virtual gateway, the one or more services over first physical customer local area network.

In another aspect, an apparatus for OTT internet service provisioning is provided. The apparatus may include a processor, and non-transitory computer readable media comprising instructions executable by the processor to instantiate a virtual gateway associated with a first physical customer local area network coupled to a user device associated with a first customer. The instructions may further be executable to create, via the virtual gateway, a secure domain associated with the first physical customer local area network and determine whether a subscriber account is associated with the first customer. Responsive to determining that a subscriber account is not associated with the first customer, the instructions may be executable to provide, via the first physical customer local area network, a consumer portal to the user device. The instructions may further be executed by the processor to receive, from the user device, a selection of one or more services through the consumer portal, establish, via the virtual gateway, a connection to a service provider network associated with the one or more services, and provision, via the virtual gateway, the one or more services over first physical customer local area network.

In a further aspect, a method for OTT internet service provisioning is provided. The method may include instantiating, via an enhanced network gateway, a virtual gateway associated with a first physical customer local area network coupled to a user device associated with a first customer. The method may continue by creating, via the virtual gateway, a secure domain associated with the first physical customer local area network, and determining whether a subscriber account is associated with the first customer. Responsive to a determination that a subscriber account is not associated with the first customer, the method may continue by providing, via the first physical customer local area network, a consumer portal to the user device. The method may further include receiving, from the user device, a selection of one or more services through the consumer portal, establishing, via the virtual gateway, a connection to a service provider network associated with the one or more services, and provisioning, via the virtual gateway, the one or more services over the first physical customer local area network.

Various modifications and additions can be made to the embodiments discussed without departing from the scope of the invention. For example, while the embodiments described above refer to specific features, the scope of this invention also includes embodiments having different combination of features and embodiments that do not include all the above described features.

Figure 1:
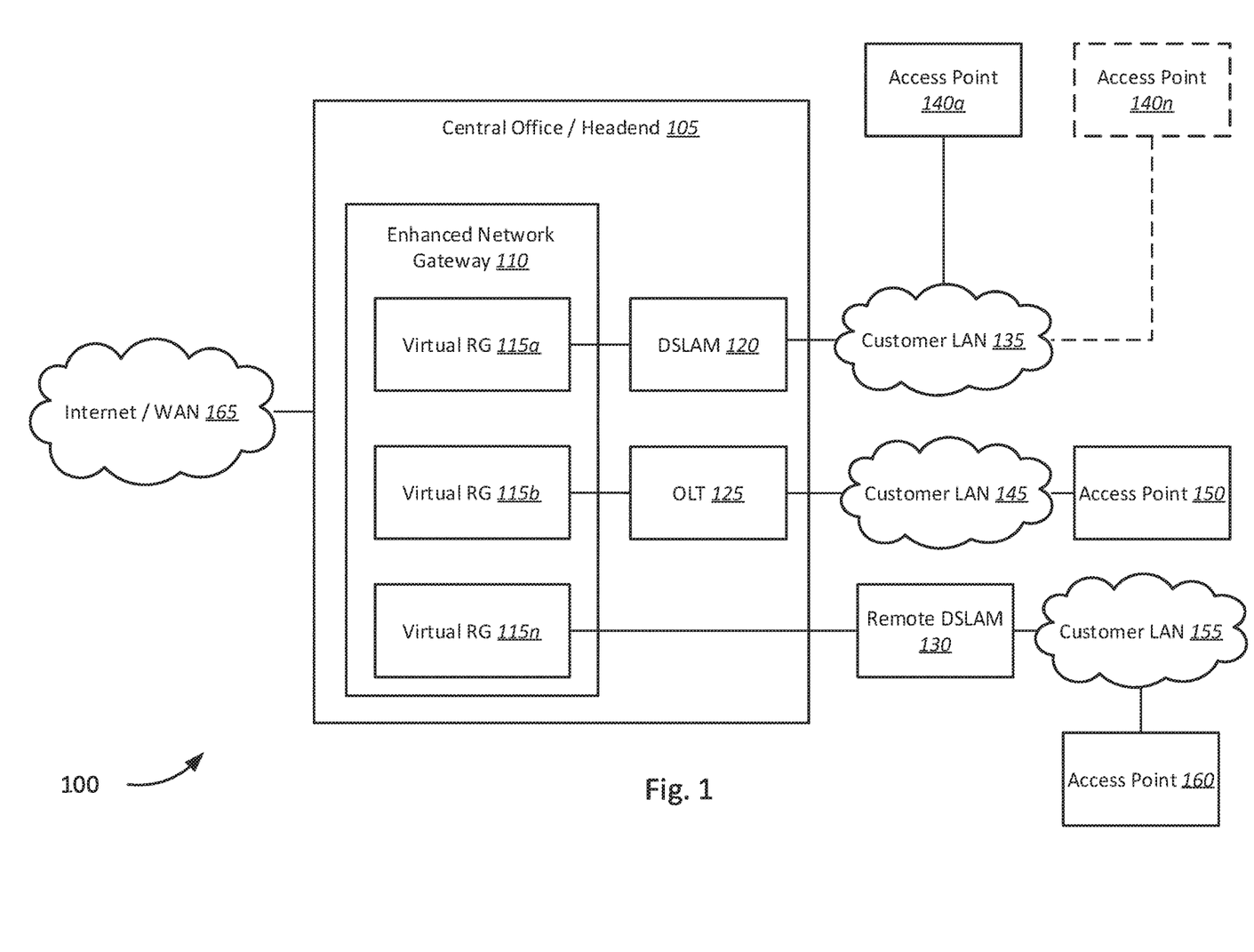
FIG. 1 is a schematic block diagram of a system for OTT internet service provisioning, in accordance with various embodiments.

FIG. 1 is a schematic block diagram of a system 100 for OTT internet service provisioning, in accordance with various embodiments. The system 100 includes a central office (CO) 105 (or alternatively a headend), an enhanced network gateway 110, a plurality of virtual residential gateways (RG) 115a-115n (collectively "virtual RGs 115"), a digital subscriber line access multiplexer (DSLAM) 120, an optical line termination (OLT) 125, a remote DSLAM 130, a first customer local area network (LAN) 135, one or more first access points 140a-140n (collectively "first access points 140"), a second customer LAN 145, a second access point 150, a third customer LAN 155, and a third access point 160. It should be noted that the various components of the system 100 are schematically illustrated in FIG. 1, and that modifications to the system 100 may be possible in accordance with various embodiments.

In various embodiments, the CO 105 may include an enhanced network gateway 110, further comprising a plurality of virtual RGs 120, a DSLAM 120, and OLT 125. A first virtual RG 115a may be coupled to the DSLAM 120, and a second virtual RG 115b may be coupled to the OLT. An nth virtual RG may be coupled to a remote DSLAM 130 located outside of the central office 105. While, in various embodiments the CO 105 may refer to a central office, it will be appreciated that in some embodiments the CO 105 may alternatively be, for example, a cable headend facility. Similarly, while DSLAM 120 and OLT 125 are provided by way of example, it will be appreciated that in some embodiments the headend may include a cable modem termination system (CMTS) to which one or more virtual RGs 115a-115n may be coupled.

Accordingly, the virtual RGs 115 of the CO 105, located physically at the CO 105, may be coupled to respective customer LANs 135, 145, 155, which are in turn coupled to one or more access points associated with one or more customer respectively. For example, in some embodiments, the DSLAM 120 may be coupled to a first customer LAN 135 to which one or more first access points 140a-140n may be coupled. The OLT 125 may be coupled to a second customer LAN 145 to which the second access point 150 is coupled. The remote DSLAM 130 may be coupled to a third customer LAN 155 to which the third access point 160 is coupled. Accordingly, each of the respective customer LANs 135, 145, 155 may be logically extended, outside of a respective customer premises, to the CO 105.

In various embodiments, CO 105 may include an enhanced network gateway 110 hosting the one or more virtual RGs 115a-115n, through which customer LANs 135, 145, 155 are logically extended to the CO 105. Accordingly, the enhanced network gateway 110 may include hardware, software, or hardware and software, both physical and/or virtual. In some embodiments, the enhanced network gateway 110 may be implemented on, without limitation, one or more server computers, dedicated custom hardware appliances, programmable logic controllers, single board computers, field programmable gate arrays (FPGA), application specific integrated circuits (ASIC), or a system on a chip (SoC). As will be described in greater detail below, with respect to FIG. 2, the enhanced network gateway 110 may be physical host machine, such as a server or other computer system, configured to host one or more virtual RG 115a-115n instances, and may further include network function virtualization infrastructure (NFVI), such as a hypervisor and/or one or more other NFV/virtualized network function (VNF) management and orchestration systems. Alternatively, the enhanced network gateway 110 may be coupled to remotely located NFV infrastructure (NFVI), including a remotely located hypervisor and/or NFV/VNF management and orchestration systems, accessible via the internet/WAN 165.

In various embodiments, the enhanced network gateway 110 may be configured to provide a respective consumer portal accessible by a respective customer, via their respective access points 140a-140n, 150, 160 over respective customer LAN 135, 145, 155 connections to the CO 105. Accordingly, in some embodiments, the enhanced network gateway 110 may be configured to present a respective consumer portal for each customer and/or customer LAN. In some examples, the enhanced network gateway 110 may be configured to instantiate a respective virtual RG 115a-115n for each new connection from a respective customer and/or customer LAN. In some examples, the consumer portal may, in turn, be provided via the respective RG 115a-115n. Accordingly, for each customer LAN 135, 145, 155, the enhanced network gateway 110 may be configured to create a logically separated secure domain that provides secure access to network resources and/or services for each respective customer domain. The consumer portal may be configured to allow a customer to select and provision one or more services to receive. For example, the one or more services may include, without limitation, voice, video, and data services. In some further examples, the consumer portal may be configured to allow a customer to select between one or more service providers.

Accordingly, a customer may be able to access a consumer portal to provision one or more network services via any respective access point providing connectivity to the CO 105. For example, access points 140a-140n, 150, 160 may include, without limitation, traditional network interface devices (NID) including optical network terminals (ONT), traditional gateway devices (such as a set-top box (STB), RG, modem, etc.), wireless access points, routers, switches, or a network access device as described in U.S. patent application Ser. No. 15/148,721 filed on May 6, 2016 now U.S. Pat. No. 9,733,975 (hereinafter "the '975 patent"), the entire disclosures of which are herein incorporated by reference, in their entireties, for all purposes. In some further embodiments, the access point 140a-140n, 150, 160 may be a dedicated appliance configured to establish, over an existing network connection, a connection to a respective enhanced network gateway 110 located at a respective CO 105. Accordingly, potential customers may be able to access a respective consumer portal via, respective existing network infrastructure, and through various types of access points.

Accordingly, functions previously provided by customer-premises equipment (CPE), such as traditional RGs, STBs, voice over internet protocol (VoIP) base stations, etc., may now be pushed further into the service provider network as virtual machines running on a respective enhanced gateway 110, and vice versa, cloud-based services and functionality is pushed closer to the customer premises. Accordingly, once the one or more services are selected and configured via a consumer portal, the enhanced network gateway 110 may be configured to provide the one or more services to the respective customer over a respective VLAN/customer domain over a respective logical customer LAN 135, 145, 155.

For example, in some embodiments, different access points, such as the one or more first access points 140a-140n, on physically separate networks may be logically treated as part of the same customer LAN 135. In one example, a customer at first access point 1 140a may configure one or more services to receive. A user associated with the customer may also be able to receive the services configured by the customer at a physically separate location and network, through a separate access point, such as a first access point n 140n, connected to a respective CO through a physically different network connection. For example, a respective enhanced network gateway 110 may be configured to present a consumer portal, as described above, to the user associated with the customer (e.g., customer account). The portal may, thus, be configured to authenticate the user may and authorize the user to receive one or more services as if located on the same customer LAN, in this case the first customer LAN 135. The respective enhanced network gateway 110 of the respective CO 105 may then be configured to instantiate a first virtual RG 115a to provide services as selected by the customer that created the customer account. In some embodiments, the customer may further control what services and functions are accessible to different users and/or different locations. Thus, the enhanced network gateway 110 may further be configured to determine what services and/or functions are authorized by the customer to a user associated with a different access point, such as access point n 140n, and configure a respective virtual RG 115a. Accordingly, in some embodiments, the enhanced residential gateway 110 may further comprise a policy engine configured to allow a customer to define one or more policies, including, without limitation, policies for networking or other applications, device policies, etc. For example, in some embodiments, access to a webcam, network storage device, etc., may be restricted or allowed based on a location of a user accessing the webcam or network storage device even though the users are logically part of the same customer LAN 135.

Thus, as described above, through VLAN management at the enhanced network gateway 110, and through respective virtual RGs 115a-115n, one or more network services may be provisioned as customer-specific overlays over underlying network infrastructure without the need to deploy a traditional, service provider specific, and/or customer-specific RG devices and network infrastructure to provide traditional connectivity, such as, for example, traditional network management systems, element management systems, subscriber management systems, and other infrastructure control and management (ICM) systems. Instead, an enhanced network gateway 110 may leverage NFVI and VNF management systems, such as network controllers (e.g., software defined network (SDN) controller, etc.), network function virtualization (NFV) orchestrators, and the like, to provision OTT network services over the underlying network infrastructure and pushing the capabilities of traditional provisioning systems to the enhanced network gateway 110.

In turn, in various embodiments, the physical circuit of the customer LANs 135, 145, 155 may be controlled by a third-party service provider. Similarly, the CO 105 may also be controlled and/or provided by the third-party service provider. Accordingly, in some embodiments, a customer and/or customer premises physically connected to the third-party service provider (and not the network service provider associated with the enhanced network gateway 110) may be able to be provisioned with network services by the network service provider. For example, by utilizing the underlying physical circuits to the respective customers, the enhanced network gateway 110 and respective virtual RGs 115a-115n may be configured to allow each of the customers to receive network services over the underlying physical network infrastructure from the network service provider. Correspondingly, the enhanced network gateway may further be configured to allow the network service provider to provision network services to each of the customers via respective virtual RGs 115a-115n over the underlying physical network infrastructure. In this way, similar to unbundled network elements, the enhanced network gateway 110 allows service providers to offer services over a third-party service provider's physical infrastructure. By pushing RG and/or business gateway functionality to the CO 105, and by the same token bringing cloud compute resources closer to the customer premises, services may be able to be provided to a customer while being agnostic to the underlying physical architecture.

In further embodiments, the enhanced network gateway 110 may be configured to deliver a consistent network service experience to a customer regardless of underlying physical architecture. For example, in some embodiments, a customer may be able to receive network services with the same QoS and service experience from different locations and over physical infrastructure owned by two or more different third-party service providers. For example, a first customer may purchase and be provisioned to receive, for example, 100 megabit internet service over a first customer LAN 135. The first customer may similarly be able to receive 100 megabit internet service over a remote customer LAN (not shown) associated with a different underlying third-party service provider. For example, the first customer LAN 135 may include a connection from the first customer's customer premises to a central office 105 associated with a first third-party service provider. The central office 105 may, accordingly, include an enhanced network gateway 110 associated with the network service provider to provide network services to the first customer via the first virtual RG 115a. In some embodiments, the first customer may be able to connect to and receive 100 megabit internet service from, for example, a restaurant, library, coffee shop, a family member's premises, a public wireless access point, or other remote local area network. Accordingly, in some embodiments, the remote local area network may allow the first customer to connect to a respective central office (not shown) associated with a different third-party service provider. The respective central office may, thus, include a respective enhanced network gateway (not shown) associated with the network service provider. The respective enhanced network gateway, accordingly, may be configured to instantiate a respective instance of virtual RG 115a configured to provide 100 megabit internet service to the first customer over the respective physical circuit of the remote local area network.

Accordingly, network services and service experience may be provisioned to new customers without regard to the party that owns the underlying physical infrastructure (e.g., over-the-top), and a respective customer's network service experience (e.g., QoS, SLA, etc.) may be transportable with the customer, regardless of the owner of the underlying physical infrastructure. Thus, in this manner, internet service may be provisioned OTT of an underlying physical circuit, by providing an enhanced network gateway 110 at respective COs that are configured to instantiate the appropriate instances of virtual RGs 115a-115n for each of one or more respective customers coupled to the respective enhanced network gateway 110.

Figure 2:
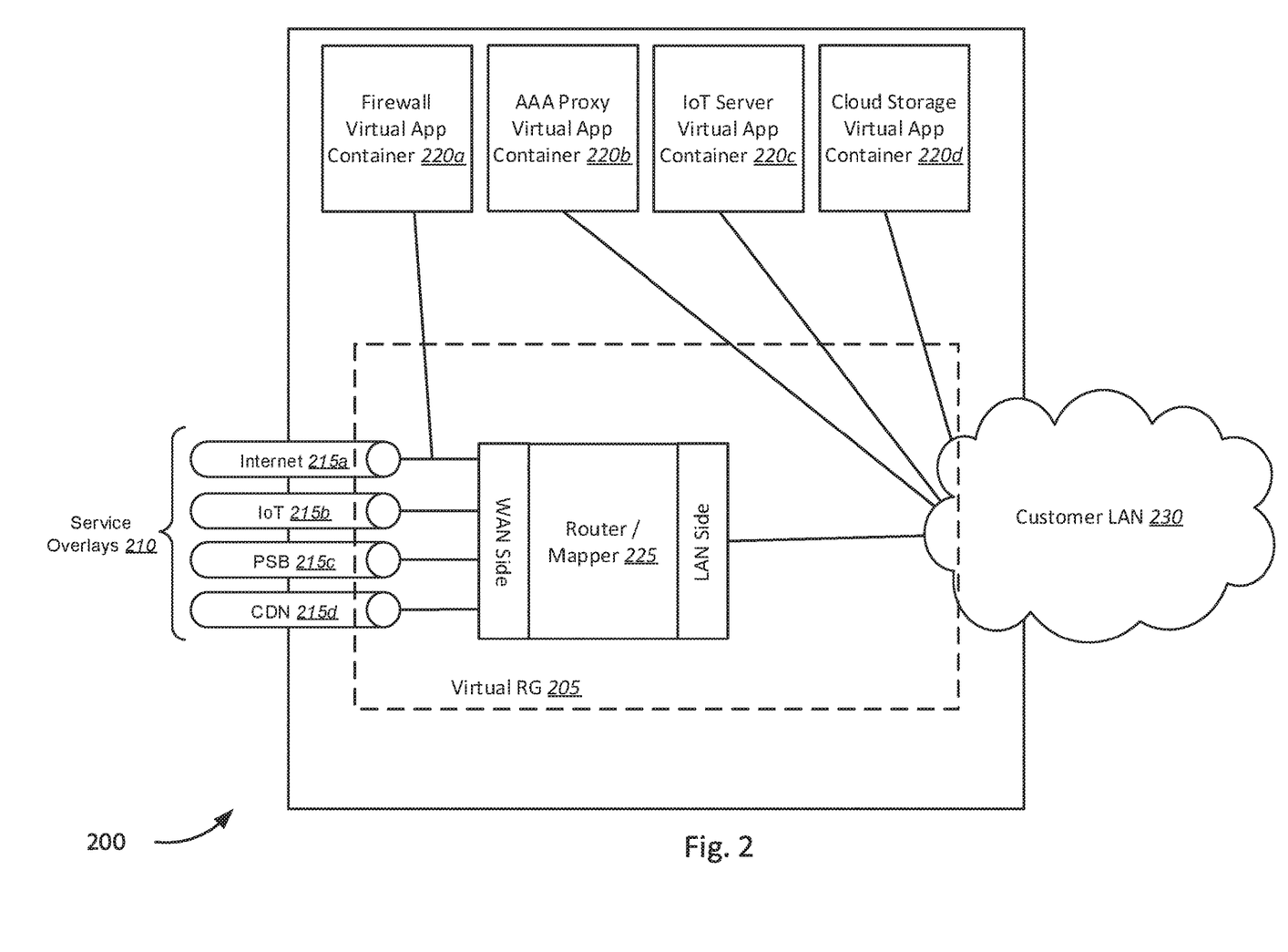
FIG. 2 is a schematic block diagram of an enhanced network gateway for OTT internet service provisioning, in accordance with various embodiments.

Thus, an enhanced network gateway 110, as described above, is illustrated in FIG. 2. FIG. 2 is a system block diagram of an enhanced network gateway 200 for OTT internet service provisioning, in accordance with various embodiments. The enhanced network gateway 200 may include a virtual RG 205 container, which may be configured to receive a set of fully isolated service overlays 210 associated with the virtual RG 205, the service overlays 210 including internet service 215a, IoT service 215b, a programmable service backbone (PSB) services 215c, and content distribution network (CDN) services 215d. The enhanced network gateway 200 may further include one or more virtual application containers 220a-220d, including a firewall virtual app container 220a, authentication, authorization, and accounting (AAA) proxy virtual application container 220b, IoT server virtual application container 220c, and cloud storage virtual application container 220d. The virtual RG 205 may further include a router/mapper 225 configured to route and/or map traffic from the WAN/internet to the customer LAN 230, and to add applications and services, from the respective virtual app containers 220a-220d, at any point by modifying the mappings. It should be noted that the various components of the system (e.g., the enhanced network gateway 200) are schematically illustrated in FIG. 2, and that modifications to the system 200 may be possible in accordance with various embodiments.

In various embodiments, the enhanced network gateway 200 may be configured to provision the one or more services, described above, via the virtual RG 205 to the respective customer LAN 230. To do so, the router/mapper 225 may be configured to control the mappings between traffic received from the Internet and/or WAN to the customer LAN 230. In various embodiments, the customer LAN 230 providing access to the virtual RG 205 may include various types of access networks, such as a wireless, hybrid, or backup. Thus, in various embodiments, when a customer connects to the virtual RG 205 via the customer LAN 230, the virtual RG 205 may be configured to present a consumer portal to the customer.

Thus, in various embodiments, the enhanced network gateway 200 may be configured to provide one or more virtual applications which may be invoked and/or executed by each virtual RG instance, such as virtual RG 205, as needed and/or requested by a respective customer. In some embodiments, virtual application containers 220a-220d may include programs that are logically isolated and deployed specific to a respective virtual RG 205. For example, the firewall virtual application container 220a may be invoked to provide firewall functionality for internet traffic going to the customer LAN 230. The AAA proxy virtual application container 220b may be invoked to perform authentication and authorization, process payment, and handle other subscriber management features. In some embodiments, the AAA proxy virtual application container 220b may further be coupled to the Internet/WAN, and/or the router/mapper 225 to process authentication and authorization features remotely. In various embodiments, if the customer selects IoT services for provisioning, an instance of an IoT server may be provided to the customer LAN 230 via the IoT server virtual application container 220c. A cloud storage virtual application container 220d may further be deployed, allowing shared files, media, and other stored data to be accessed on a respective customer LAN 230.

Accordingly, in various embodiments, different types of virtual applications may be made available at the enhanced network gateway 200, or via an application server accessible via a WAN and/or the Internet. It is to be understood that the types of virtual applications available at the enhanced network gateway 200 are not limited to the virtual application containers 220a-220d depicted. The types of virtual applications may vary depending on the types of network services and/or resources available to a respective customer. In this way, services specific to each respective customer may be provisioned via respective virtual RGs, such as virtual RG 205.

Figure 3:
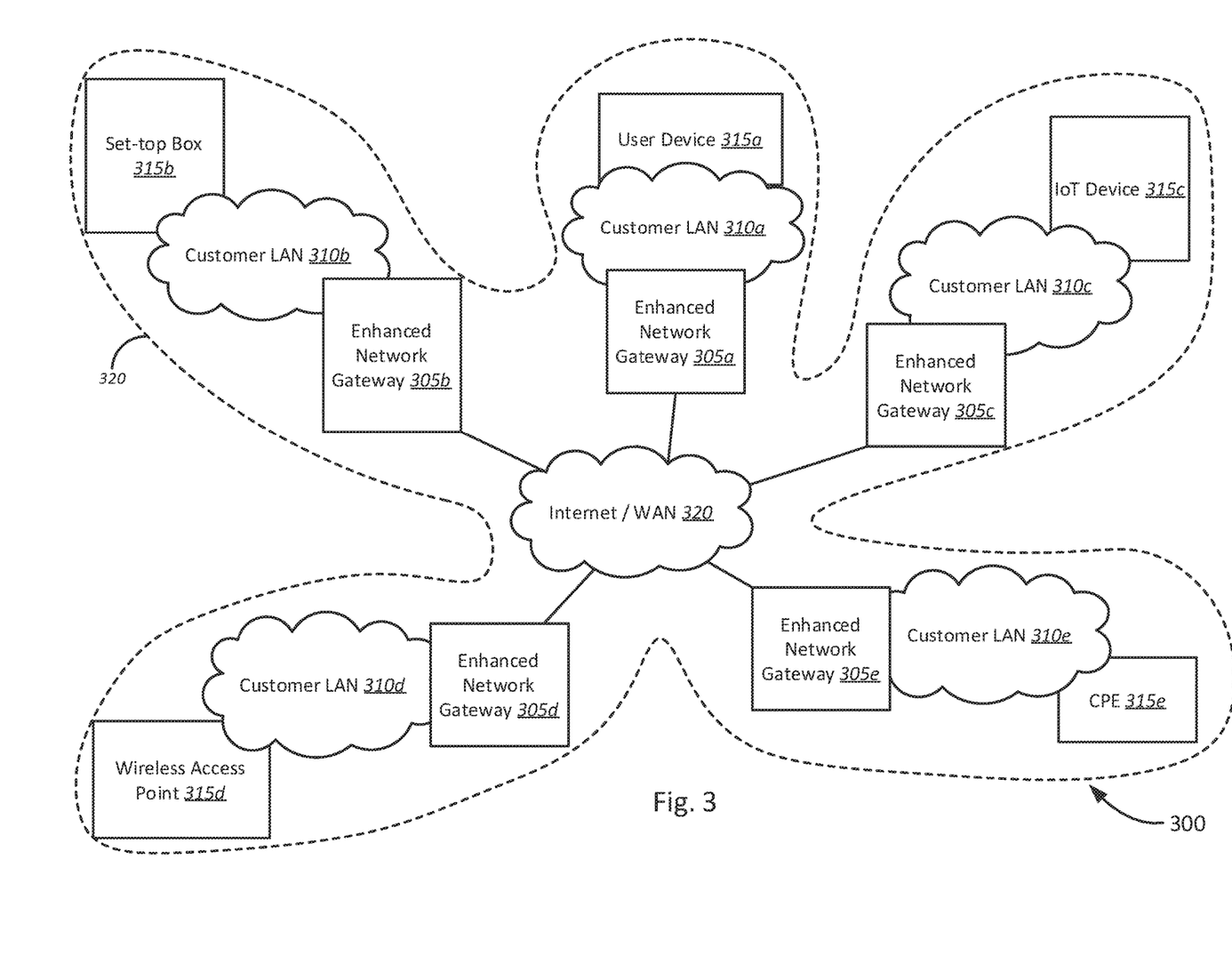
FIG. 3 is a schematic block diagram of an example topology for providing distributed OTT internet service, in accordance with various embodiments.

FIG. 3 is a schematic block diagram of an example topology 300 for providing distributed OTT internet service, in accordance with various embodiments. The example topology 300 may include enhanced network gateways 305a-305e, each coupled to a respective user device 315a-315e, via a respective physical customer LAN 310a-310e. Each of the enhanced network gateways 305a-305e may be coupled to each other (or other management systems) via the Internet/WAN 320. It should be noted that the various components of the topology 300 are schematically illustrated in FIG. 3, and that modifications to the system 300 may be possible in accordance with various embodiments.

In various embodiments, each of the physical customer LANs 310a-310e may be associated with the same logical customer LAN 320. Accordingly, to the respective user devices 315a-315e, the respective customer LANs 315a-315e may appear to be part of the same LAN 320, and devices coupled to the respective customer LANs 315a-315e may appear to be on the same LAN 320, although connected through different physical connections/networks. Each of the respective user devices, however, may be coupled to a respective enhanced network gateway 305a-305e physically located at different respective COs. In the arrangement depicted, the topology 300 may be conceptualized as a "flat-dead-dog" ("FDD") topology, in which each of the "limbs" of the FDD may correspond to a separate physical customer LAN 315a-315e.

For example, a first customer associated with a first user device 315a may be coupled to the first enhanced network gateway 305a via the first physical customer LAN 310a. A respective virtual RG running on the first enhanced network gateway 305a may thus be configured to allow the first user device 315a to select and configure desired services, and in some examples, to define policies for providing services and/or applications at other locations and/or devices. For example, the first user device 315a may be configured to select and configure television service. A set-top box 315b, connected to the second enhanced network gateway 305b, located at a different CO, over a second physical customer LAN 310b may nonetheless receive video service at the set-top box 315b as if physically on the first physical customer LAN 310a. Accordingly, the second enhanced network gateway 305b may be configured to provide a respective virtual RG associated with the first customer to provide the services selected by the customer, and according to any policy defined by the customer. In some embodiments, this may include layer 2 traffic adjustments at a respective CO and/or enhanced network gateway 305a-305e, of which underlying network infrastructure may belong to a different service provider, to allow traffic to and from the respective user devices 305a-305e to be processed through an appropriate virtual RG of the respective enhanced network gateway 305a-305e. For example, IoT device 315c may belong to a third physical customer LAN 310c, through which it may establish a connection to the third enhanced network gateway 305c. The third enhanced network gateway 305c may be configured to provision a respective virtual RG and IoT server functionality, as previously described with respect to FIG. 2.

Thus, regardless of the underlying physical network infrastructure, traffic to and from associated devices may logically be treated as part of the same LAN. For example, the first user device 315a may have control over the wireless access point 315d and/or any other devices coupled to the customer LAN as if on the same local area network. For example, devices coupled to the wireless access point 315d may further share access to, for example, private file transfer and storage on and between local network devices, media streaming across local network devices (e.g., digital media renderers), local network administration and management functions, among other functions.

Figure 4:
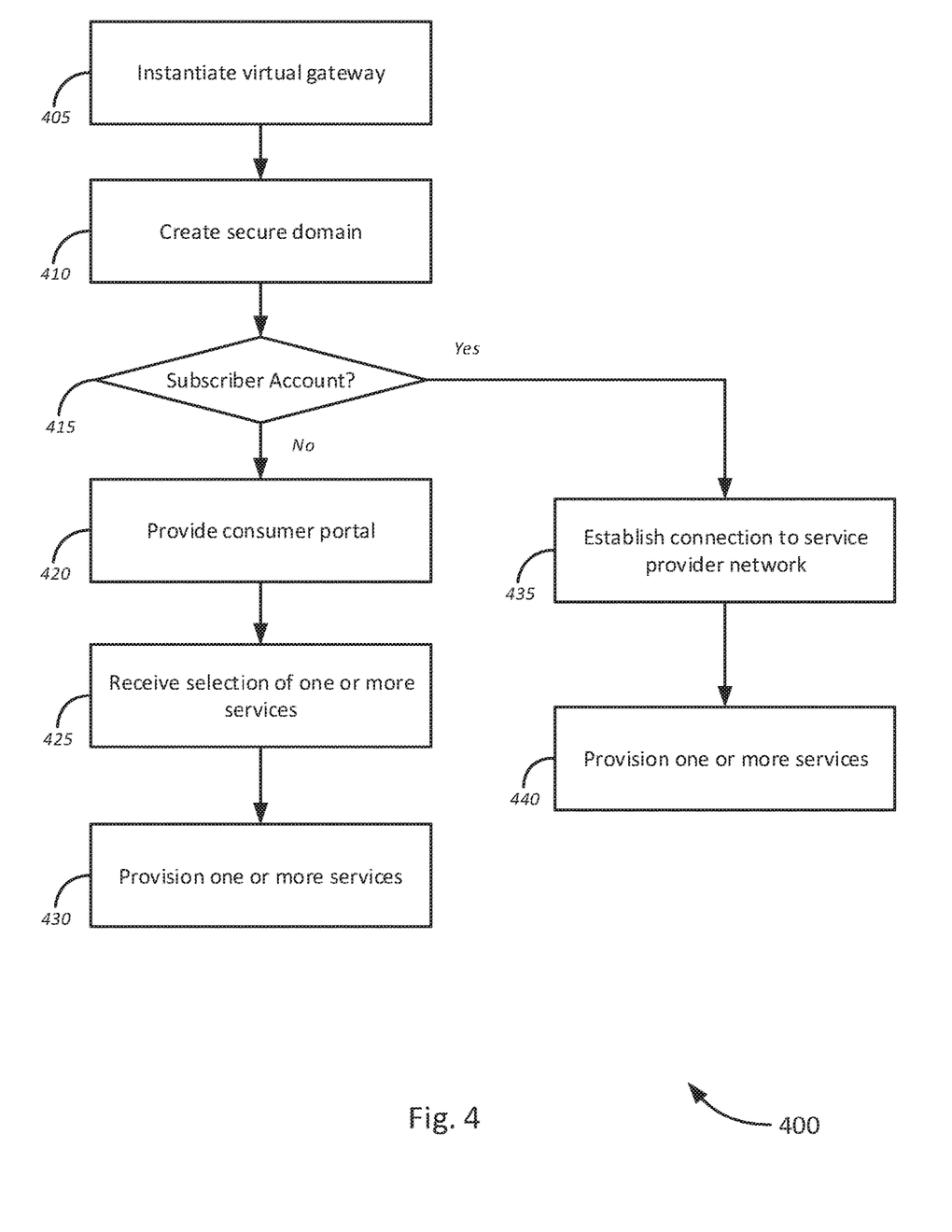
FIG. 4 is a flow diagram of a method for OTT internet service provisioning.

FIG. 4 is a flow diagram of a method 400 for OTT internet service provisioning. The method 400 may begin, at block 405, by instantiating, via an enhanced network gateway, a virtual gateway associated with a first physical customer LAN coupled to a user device associated with a first customer. As previously described, in various embodiments, the enhanced network gateway may be configured to instantiate a respective virtual RG for each new connection from a respective customer and/or customer LAN.

At block 410, the method 400 may continue, by creating, via the virtual gateway, a secure domain associated with the first physical customer LAN. In various embodiments, for each customer LAN the enhanced network gateway may be configured to create a logically separated secure domain that provides secure access to network resources and/or services for each respective customer domain.

At decision block 420, the method 400 may continue by determining whether a subscriber account is associated with the first customer. Responsive to a determination that a subscriber account is not associated with the first customer, the method 400 may continue, at block 420, by providing, via the first physical customer LAN, a consumer portal to the user device. In various embodiments, the consumer portal may, in turn, be provided via a respective virtual RG.

At block 425, the virtual gateway may receive, from the user device, a selection of one or more services through the consumer portal. In various embodiments, the consumer portal may be configured to allow a customer to select and provision one or more services to receive. For example, the one or more services may include, without limitation, voice, video, and data services. In further embodiments, the consumer portal may be configured to allow a customer to select one or more services and/or between one or more service providers.

At block 430, the virtual gateway may then establish a connection to a service provider network associated with the one or more services, and provision the one or more services over the first physical customer LAN. For example, as previously described, the service provider associated with the one or more services may not control the underlying physical circuit of the first physical customer LAN, over which the one or more services may be provided. Accordingly, in various embodiments, the virtual gateway may be configured to establish a connection to a service provider network (e.g., via a WAN/the Internet) to provision the one or more services. In some embodiments, provisioning the one or more services may include, for example, invoking one or more instances of one or more virtual applications, VNFs, and leveraging other NFV systems to provide the one or more services.

At decision block 420, if it is determined by the virtual gateway that a subscriber account is associated with the first customer, the virtual gateway may determine what services are associated with the subscriber account and establish, at block 435, a connection to the service provider network associated with one or more services indicated to be provided to the subscriber account. For example, in some embodiments, the customer and/or subscriber may be associated with an existing account that the virtual gateway may determine should receive one or more services. Accordingly, as previously described, the enhanced network gateway may be configured to allow customers to access and receive their network services with the same service experience (e.g., QoS, SLA, etc.) from any underlying local area network. Accordingly, in some embodiments, the virtual gateway may be configured to determine that the associated subscriber account should receive one or more services with an associated QoS.

At block 440, the virtual gateway may then provision the one or more services to be accessed and/or received by the user device over the first physical customer LAN. As described above, both new and existing customers may be provisioned with one or more network services appropriately via respective virtual gateways. Thus, by logically extending a customer's LAN to a respectively associated CO, and in turn, pushing cloud compute resources and capabilities closer to the customer, customers may readily purchase and be provisioned to receive one or more network services over underlying physical circuits and physical network infrastructure, utilizing existing CPE and/or already available consumer devices already connected to the existing network infrastructure. Moreover, the enhanced network gateway may be configured to allow existing customers may migrate and/or transport their individualized/respective service experiences with them, regardless of the underlying physical network infrastructure. Correspondingly, the enhanced network gateway may be configured to allow service providers to provide their respectively branded services and/or service experiences in an OTT manner over underlying network infrastructure controlled by a third-party service provider.

Figure 5:
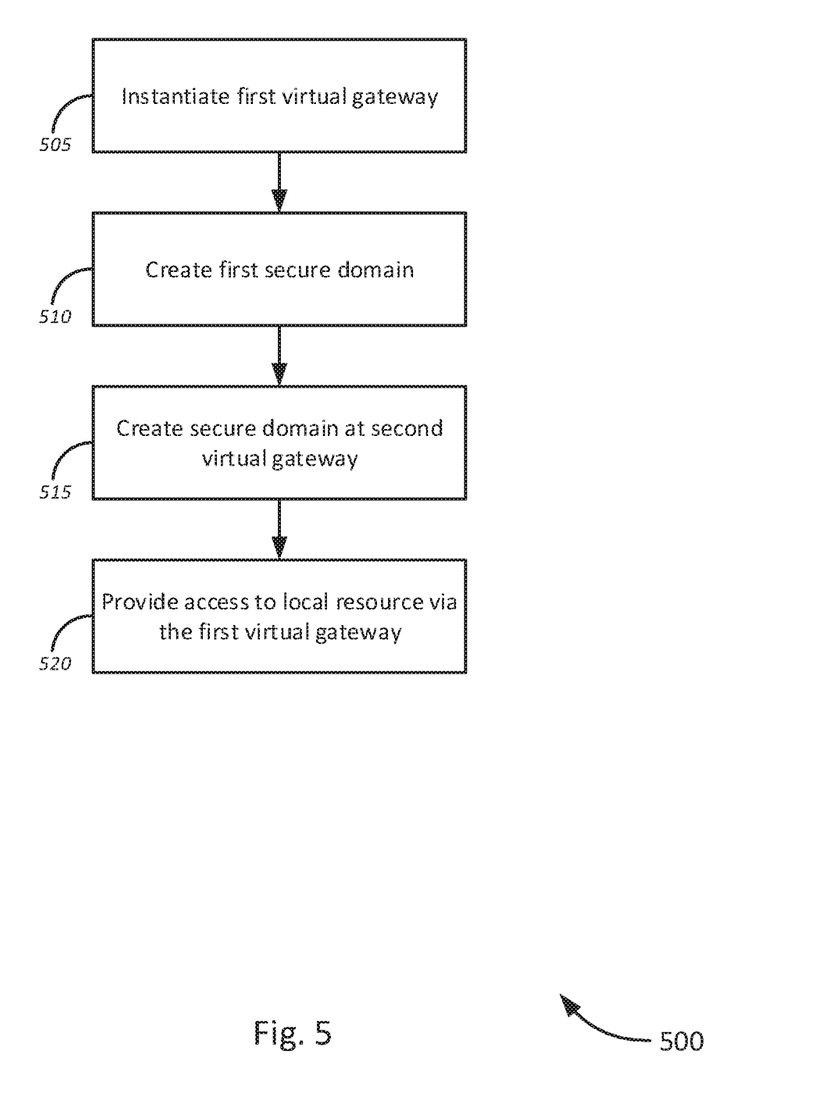
FIG. 5 is a flow diagram of a method for providing OTT access to distributed local resources.

FIG. 5 is a flow diagram of a method 500 for providing OTT access to distributed local resources. The method 500 may begin, at block 505, by instantiating, via a first enhanced network gateway, a first virtual gateway associated with a first physical customer LAN. As previously described, this may include invoking, various VNFs/NFV systems to provide, via the virtual gateway, a VLAN associated with a respective customer/subscriber, over the first physical customer LAN.

At block 510, the method 500 continues by creating, at the first virtual gateway, a secure domain associated with a first customer. As previously described, in various embodiments, a secure domain may be established associated with the first customer. The secure domain may include, a VLAN respectively associated with the first customer.

At block 515, the secure domain is created, via a second enhanced network gateway, at a second virtual gateway coupled to an at least one local resource via a second physical customer LAN. In various embodiments, an enhanced network gateway may be configured to create a second instance of the virtual RG associated with the first customer, and create a secure domain on the second instance of the virtual RG. The enhanced network gateway may, accordingly, be associated with a different physical customer LAN (e.g., second physical customer LAN) than the first physical customer LAN. Accordingly, the secure domain at the second virtual RG may be the VLAN uniquely associated with the first customer.

At block 520, access to the at least one local resource is provided, via the first virtual gateway, over the first physical customer LAN. In various embodiments, as the secure domain of the second virtual RG may be a VLAN associated with the first customer, user devices coupled to the second virtual RG may appear to be on the same logical customer LAN as devices on the first physical customer LAN. Accordingly, in various embodiments, access to a local resource physically coupled to the first physical customer LAN may be accessed via the first physical customer LAN from the second physical customer LAN. Although physically separate, user devices coupled to the respective virtual RGs of respective enhanced network gateways may logically appear to be part of the same customer LAN.

Figure 6:
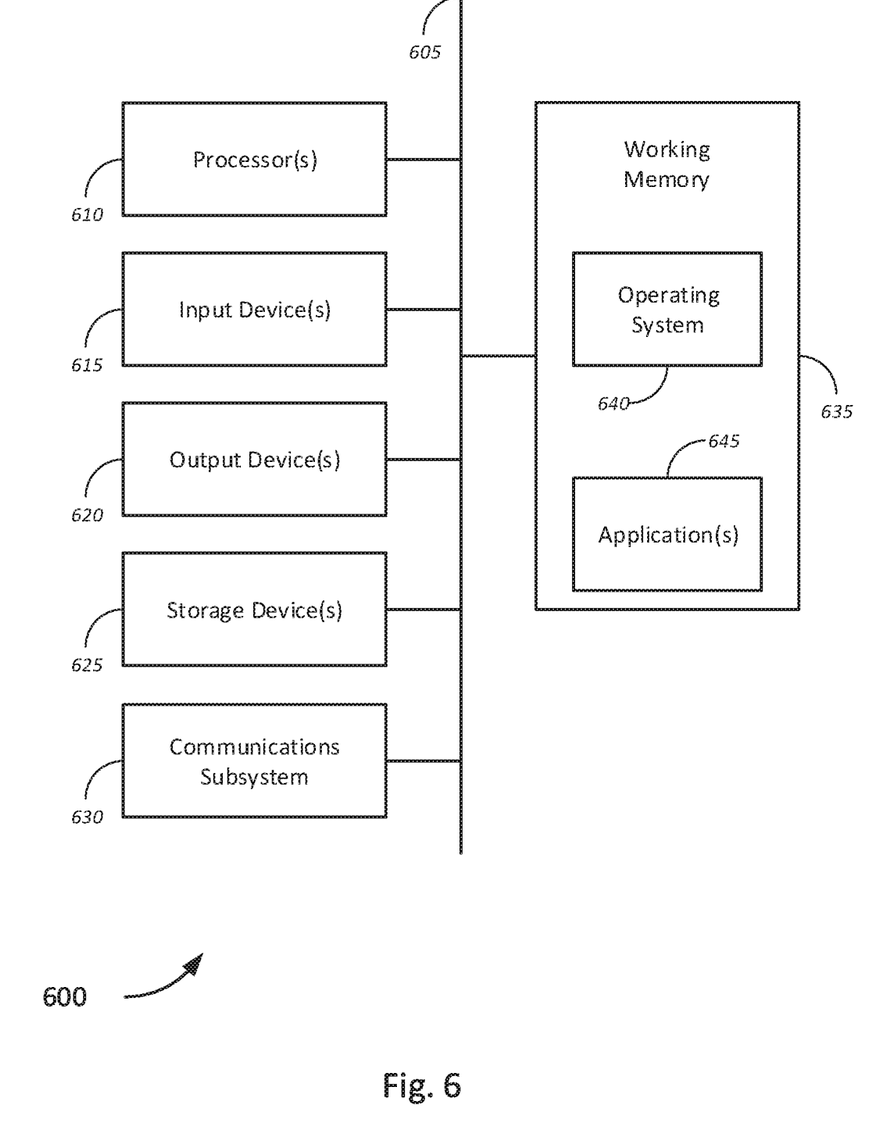
FIG. 6 is a schematic block diagram of a computer system for providing OTT access to network services, in accordance with various embodiments.

FIG. 6 is a schematic block diagram of a computer system 600 for provisioning OTT network services and/or providing OTT access to network services, in accordance with various embodiments. FIG. 6 provides a schematic illustration of one embodiment of a computer system 600, such as the enhanced network gateway, a virtual RG, network access devices and NIDs, and user devices, which may perform the methods provided by various other embodiments, as described herein. It should be noted that FIG. 6 only provides a generalized illustration of various components, of which one or more of each may be utilized as appropriate. FIG. 6, therefore, broadly illustrates how individual system elements may be implemented in a relatively separated or relatively more integrated manner.

The computer system 600 includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or a LP wireless device as previously described. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments (including, without limitation, various applications running on the enhanced network gateway as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
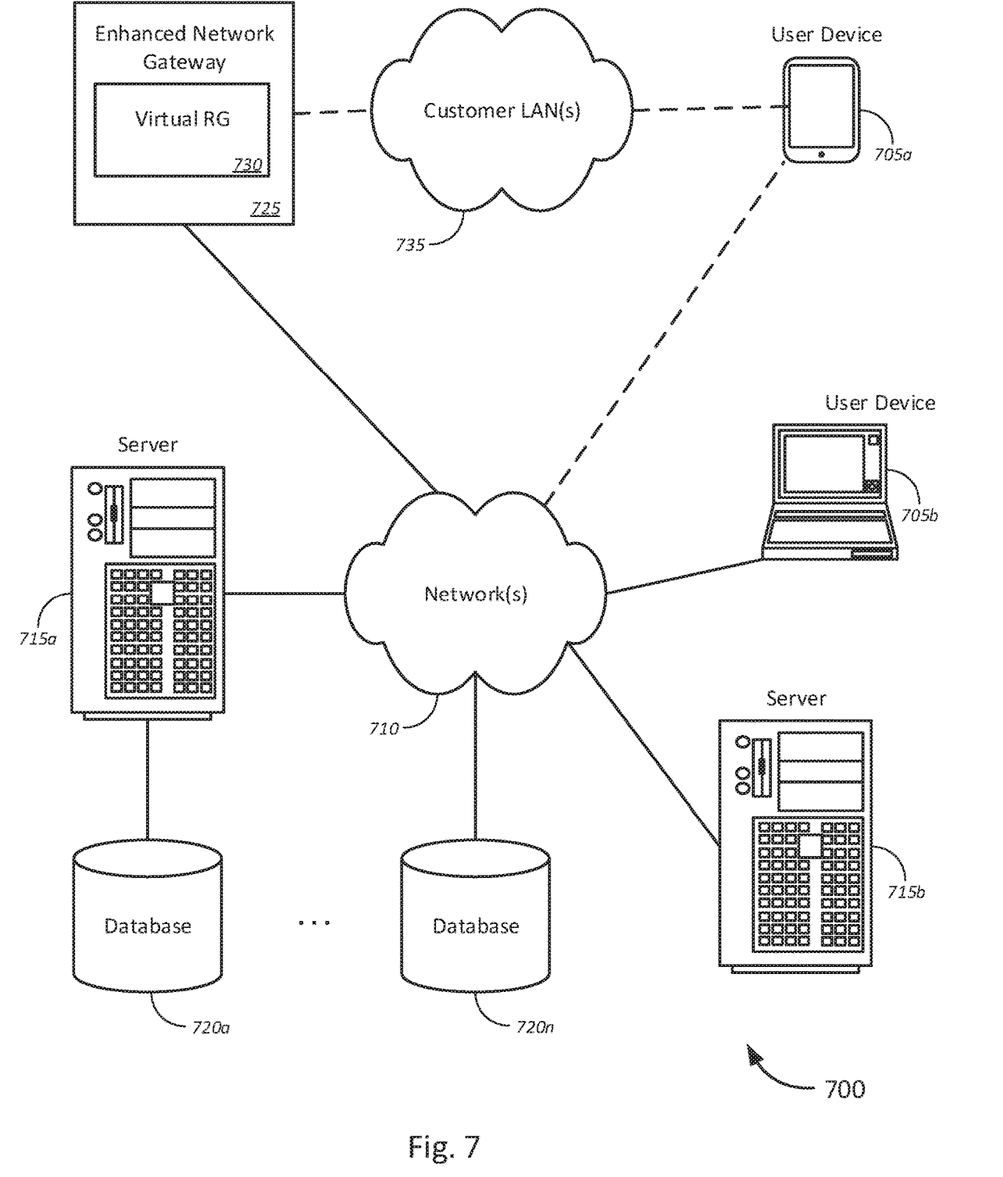
FIG. 7 is a block diagram illustrating a networked system of computing systems, which may be used in accordance with various embodiments.

FIG. 7 is a block diagram illustrating a networked system of computing systems, which may be used in accordance with various embodiments. The system 700 may include one or more user devices 705. A user device 705 may include, merely by way of example, desktop computers, single-board computers, tablet computers, laptop computers, handheld computers, and the like, running an appropriate operating system, which in various embodiments may include an ML agent, AI engine, and/or learning API as previously described. User devices 705 may further include external devices, remote devices, servers, and/or workstation computers running any of a variety of operating systems. In some embodiments, the operating systems may include commercially-available UNIX™ or UNIX-like operating systems. A user device 705 may also have any of a variety of applications, including one or more applications configured to perform methods provided by various embodiments, as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705, any number of user devices 705 may be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, management network, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications, programs, web-based services, or other network resources accessible by a client. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (or alternatively, user device 705). Alternatively, a database 720n can be remote from any or all of the computers so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers can be stored locally on the respective computer and/or remotely, as appropriate.) In one set of embodiments, the database 720 may be a relational database configured to host one or more data lakes collected from various data sources, user devices 705, or other sources. Relational databases may include, for example, an Oracle database, that is adapted to store, update, and retrieve data in response to SQL-formatted commands. The database might be controlled and/or maintained by a database server. The system 700 may further include an enhanced network gateway 725 including a virtual RG coupled to a user device, such as user device 705a, via a customer LAN 735.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
    a user device associated with a first customer;
    a first physical customer local area network including at least part of a physical circuit from the user device to a network edge;
    an enhanced network gateway, the network edge comprising the enhanced network gateway, the enhanced network gateway further comprising:
    a processor; and
    non-transitory computer readable media comprising instructions executable by the processor to:
    instantiate a virtual gateway associated with the first physical customer local area network;
    create, via the virtual gateway, a secure domain associated with the first physical customer local area network;
    determine whether a subscriber account is associated with the first customer;
    responsive to determining that a subscriber account is not associated with the first customer, provide, via the first physical customer local area network, a consumer portal to the user device;
    receive, from the user device, a selection of one or more services through the consumer portal;
    establish, via the virtual gateway, a connection to a service provider network associated with the one or more services; and
    provision, via the virtual gateway, the one or more services over first physical customer local area network.

2. The system of claim 1, wherein the instructions are further executable by the processor to:
    responsive to determining that the subscriber account is associated with the first customer, establish, via the virtual gateway, the connection to the service provider network associated with one or more services indicated to be provided to the subscriber account; and
    provision, via the virtual gateway, the one or more services over the first physical customer local area network.

3. The system of claim 2, wherein the instructions are further executable by the processor to:
    determine whether a policy is associated with the subscriber account, wherein the policy defines, at least in part, at least one of the one or more services to be provided to the first physical customer local area network; and
    provisioning, via the virtual gateway, the one or more services to the first physical customer local area network based on the policy.

4. The system of claim 2, wherein the instructions are further executable by the processor to:
    responsive to determining that the subscriber account is associated with the first customer, modify, via the virtual gateway, the secure domain to behave, at least in part, like a second secure domain associated with a second physical customer local area network different from the first physical customer local area network;
    manage, via the virtual gateway, traffic from the one or more services over the secure domain as traffic over the second secure domain over the second physical customer local area network.

5. The system of claim 4, wherein the physical circuit of the first physical customer local area network is a first communication medium different from a second communication medium of the second physical customer local area network.

6. The system of claim 1, wherein the physical circuit from the user device to the network edge is associated with a first service provider different from a second service provider, wherein the service provider network associated with the one or more services is associated with the second service provider.

7. The system of claim 6, wherein the one or more services comprises at least one of voice, video, or network services associated with the second service provider.

8. The system of claim 1, wherein the first physical customer local area network includes a wireless access point, wherein the enhanced network gateway is configured to establish a connection to the user device via the wireless access point.

9. The system of claim 1, wherein the enhanced network gateway is physically located at a first central office associated with a first service provider, wherein the first physical customer local area network includes a digital subscriber line access multiplexer located at the first central office.

10. An apparatus comprising:
a processor;
non-transitory computer readable media comprising instructions executable by the processor to:
instantiate a virtual gateway associated with a first physical customer local area network coupled to a user device associated with a first customer;
create, via the virtual gateway, a secure domain associated with the first physical customer local area network;
determine whether a subscriber account is associated with the first customer;
responsive to determining that a subscriber account is not associated with the first customer, provide, via the first physical customer local area network, a consumer portal to the user device;
receive, from the user device, a selection of one or more services through the consumer portal;
establish, via the virtual gateway, a connection to a service provider network associated with the one or more services; and
provision, via the virtual gateway, the one or more services over first physical customer local area network.

11. The apparatus of claim 10, wherein the instructions are further executable by the processor to:
responsive to determining that the subscriber account is associated with the first customer, establish, via the virtual gateway, the connection to the service provider network associated with one or more services indicated to be provided to the subscriber account; and
provision, via the virtual gateway, the one or more services over the first physical customer local area network.

12. The apparatus of claim 11, wherein the instructions are further executable by the processor to:
determine whether a policy is associated with the subscriber account, wherein the policy defines, at least in part, at least one of the one or more services to be provided to the first physical customer local area network; and
provisioning, via the virtual gateway, the one or more services to the first physical customer local area network based on the policy.

13. The apparatus of claim 11, wherein the instructions are further executable by the processor to:
responsive to determining that the subscriber account is associated with the first customer, modify, via the virtual gateway, the secure domain to behave, at least in part, like a second secure domain associated with a second physical customer local area network different from the first physical customer local area network;

manage, via the virtual gateway, traffic from the one or more services over the secure domain as traffic over the second secure domain over the second physical customer local area network.

14. The apparatus of claim 13, wherein the physical circuit of the first physical customer local area network is a first communication medium different from a second communication medium of the second physical customer local area network.

15. The apparatus of claim 10, wherein the physical circuit from the user device to the network edge is associated with a first service provider different from a second service provider, wherein the service provider network associated with the one or more services is associated with the second service provider.

16. The apparatus of claim 10, wherein the enhanced network gateway is physically located at a first central office associated with a first service provider, wherein the first physical customer local area network includes a digital subscriber line access multiplexer located at the central office.

17. The apparatus of claim 10, wherein the first physical customer local area network includes a wireless access point, wherein the enhanced network gateway is configured to establish a connection to the user device via the wireless access point.

18. A method comprising:
instantiating, via an enhanced network gateway, a virtual gateway associated with a first physical customer local area network coupled to a user device associated with a first customer;
creating, via the virtual gateway, a secure domain associated with the first physical customer local area network;
determining whether a subscriber account is associated with the first customer;
responsive to a determination that a subscriber account is not associated with the first customer, providing, via the first physical customer local area network, a consumer portal to the user device;
receiving, from the user device, a selection of one or more services through the consumer portal;
establishing, via the virtual gateway, a connection to a service provider network associated with the one or more services; and
provisioning, via the virtual gateway, the one or more services over the first physical customer local area network.

19. The method of claim 18 further comprising:
responsive to a determination that the subscriber account is associated with the first customer, establishing, via the virtual gateway, the connection to the service provider network associated with one or more services indicated to be provided to the subscriber account; and
provisioning, via the virtual gateway, the one or more services over the first physical customer local area network.

20. The method of claim 18 further comprising:
responsive to a determination that the subscriber account is associated with the first customer, modifying, via the virtual gateway, the secure domain to behave, at least in part, like a second secure domain associated with a second physical customer local area network different from the first physical customer local area network;

managing, via the virtual gateway, traffic from the one or more services over the secure domain as traffic over the second secure domain over the second physical customer local area network.

\* \* \* \* \*